E. E. GOLD.
VALVE FOR HEATING SYSTEMS AND THE LIKE.
APPLICATION FILED MAY 28, 1913.

1,133,853.

Patented Mar. 30, 1915.

2 SHEETS—SHEET 1.

WITNESSES:
René Buine
Fred White

INVENTOR:
Edward E. Gold,
By Attorneys,
Fraser, Tinkl&Myers

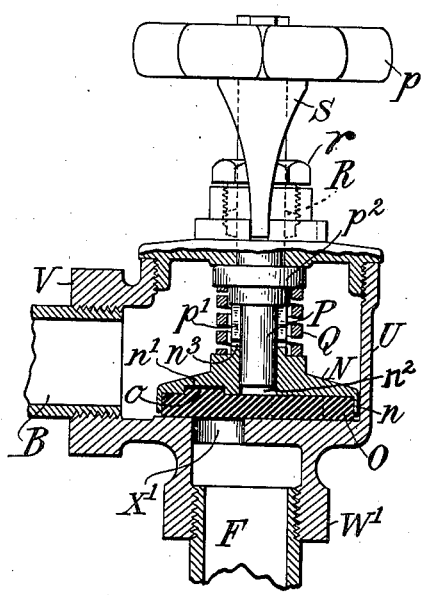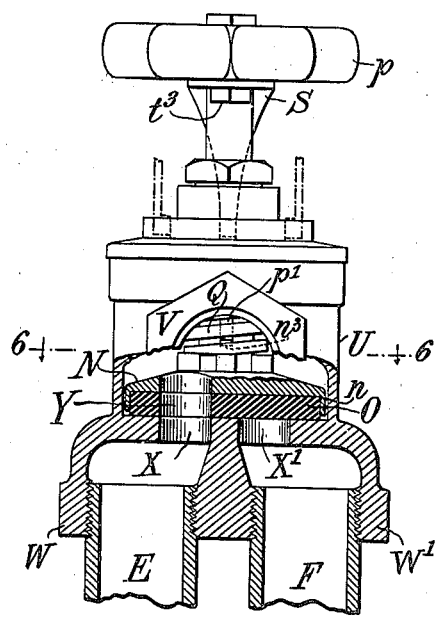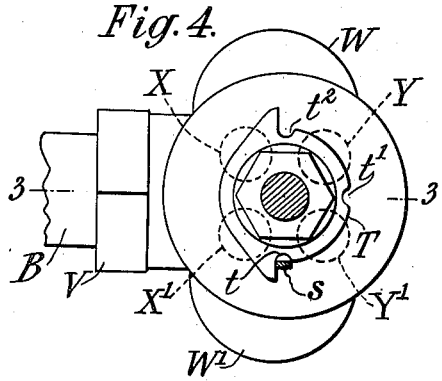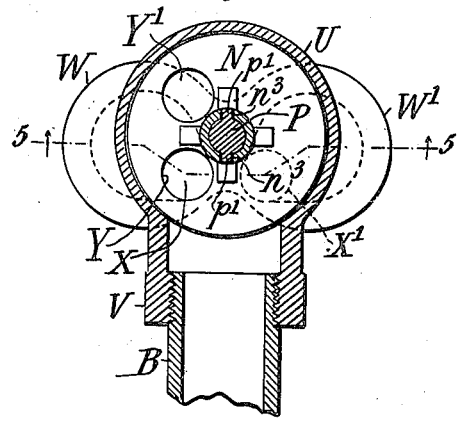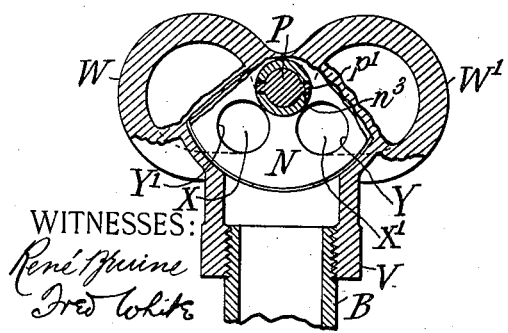

UNITED STATES PATENT OFFICE.

EDWARD E. GOLD, OF NEW YORK, N. Y., ASSIGNOR TO GOLD CAR HEATING AND LIGHTING COMPANY, OF NEW YORK, N. Y., A CORPORATION OF NEW YORK.

VALVE FOR HEATING SYSTEMS AND THE LIKE.

1,133,853.  Specification of Letters Patent.  Patented Mar. 30, 1915.

Application filed May 28, 1913. Serial No. 770,393.

*To all whom it may concern:*

Be it known that I, EDWARD E. GOLD, a citizen of the United States, residing in the borough of Manhattan, city, county, and State of New York, have invented certain new and useful Improvements in Valves for Heating Systems and the like, of which the following is a specification.

My invention has reference to a valve adapted particularly for use in a heating system and provides means whereby the amount of radiating pipe filled with heating fluid may be controlled so that more or less of the said radiator may be heated according to the weather.

My invention is particularly adapted for use in a steam heating system and is illustrated as applied to a steam heating system for use in railway passenger cars for which it is well adapted. I do not concede, however, that my valve for admitting fluid to one or more radiator pipes is necessarily limited to a steam heating system, nor to a system for heating railway cars, as it may be used upon other systems supplying fluid heating media and in other uses than upon cars.

A desired form in which my invention may be embodied is illustrated in the accompanying drawings, wherein,—

Figure 2:
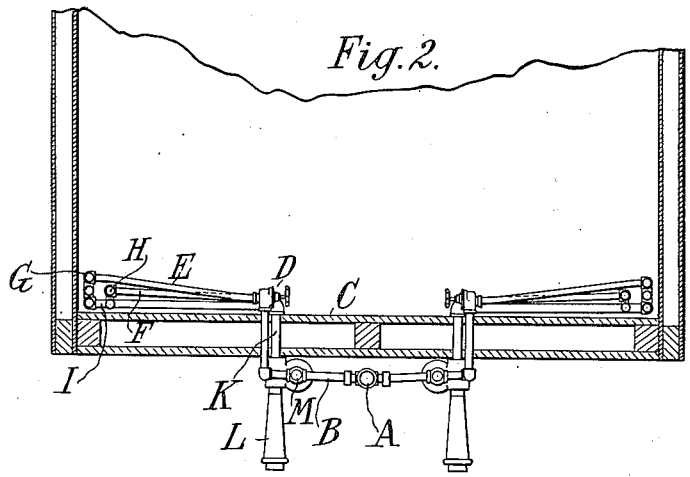
Figure 1:
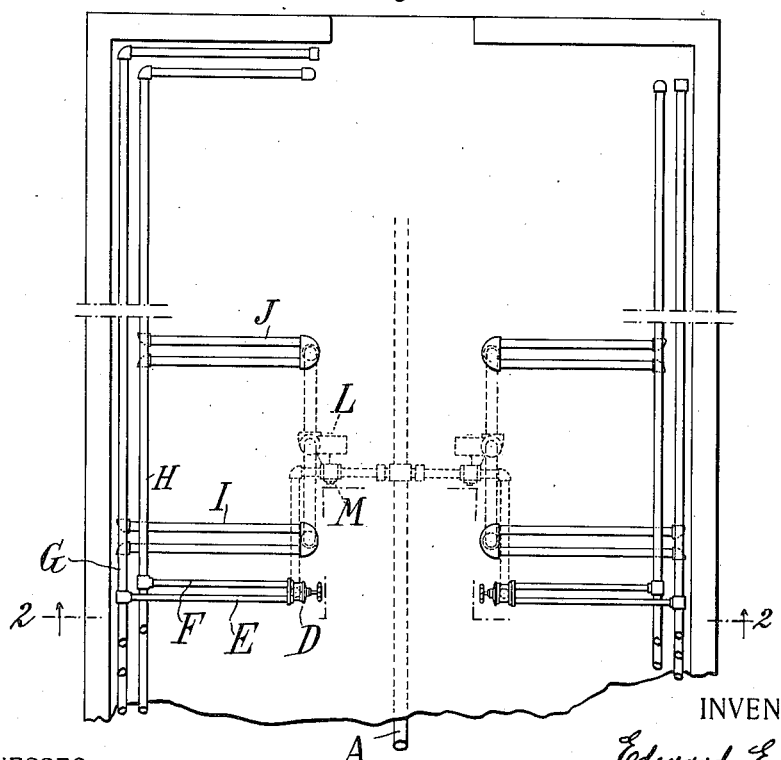

Figure 1 illustrates a plan view of a portion of a car equipped with my invention; Fig. 2 is a cross section on the line 2—2, Fig. 1; Fig. 3 is a section of the said valve on the line 3—3, Fig. 4, illustrating the valve in closed position; Fig. 4 is a plan view partly in section of Fig. 3; Fig. 5 is a view looking from the left side of Fig. 3 partly in section illustrating the device with heating fluid being admitted to one radiator; Fig. 6 is a section on the line 6—6, Fig. 5; and Fig. 7 is a section somewhat similar to Fig. 6 partly broken away to illustrate the outlet ports and showing an adjustment wherein both ports are opened.

In the particular form in which I have illustrated my invention I have shown the valve as applied to a steam heating system for use upon a railway car. Here steam is taken from the train pipe A through a branch B which extends through the double floor C of the car and leads to the valve D. The inlet pipe B is attached to this valve so as to admit steam thereto. Leading from the valve are radiator pipes E, F which lead to the respective longitudinal radiating pipes G, H and these pipes have respective returns I, J which are connected to a common outlet K and exhaust through a common drip L which may be of any usual construction. Preferably an inlet valve M will be located in the inlet pipe B and will be subject to the control of the thermostatic means located in the outlet L, but the construction of the said inlet valve M and outlet pipes K, L forms no part of the present invention.

My invention is concerned with the provision of means whereby the heat is admitted to a greater or less extent of radiator surface as required, and such means are provided in the valve D, which is illustrated on Sheet 2 of the drawings, where in Figs. 3 and 4 the valve is shown adjusted to shut steam off from both of the radiators; Figs. 5 and 6 is an adjustment which admits steam to one of the radiators, and Fig. 7 in an adjustment which admits steam to all of the radiators. The valve has a rotary disk N which is provided with a suitable wearing face O formed of any material usually employed for this purpose, such as the material known as bakelite. This is retained in a seat formed within a flange $n$ of the disk N and is held in position against turning by suitable means, such, for instance, as a dowel $o$ upon the face O which is received in a corresponding recess $n^1$ in the disk N. The disk N is turned by a valve stem P having a handle $p$. This valve stem enters a recess $n^2$ in the disk N and is so connected thereto that the said disk may be turned by the said stem and at the same time permit the disk to have a slight longitudinal movement relative to the stem. To aid in the turning of the said valve the stem has ribs $p^1$ which are received in a slotted annular sleeve $n^3$ extending upwardly from the disk N. A spring Q presses the valve disk N toward its seat and serves to compensate for wear thereon. At its upper end said spring bears against a collar $p^2$ on the stem P. A stuffing box R is provided for the valve stem as usual. An indicator S has a depending toe $s$ which indicates upon a track T formed in the casing U and having recesses $t$ $t^1$ $t^2$. The indicator S has a slight spring movement which causes the toe $s$ to pass into the recesses $t$ $t^1$ $t^2$ and hold the disk N in adjusted position. In the construction shown when the toe $s$ is in the position $t$ the valve is closed, when it is in $t^1$ the valve is admitting steam to one of the radiators, and when it is in $t^2$ it is admitting steam to both of the radiators. The indicator S is adjustably attached to the handle $p$ as by nuts $t^3$.

The casing U is provided with a flange V inclosing the inlet port and which is adapted to receive the steam inlet pipe B. It is also provided with sockets W, $W^1$ which form the outlet ports and are adapted to receive the radiator pipes E, F.

The disk N is provided with ports Y $Y^1$ seen in dotted lines in Fig. 4 and these ports are preferably the same size and are located the same distance apart as the outlet ports X, $X^1$. In the instance shown there are but two radiators E, F and therefore the outlet ports are two in number, and these ports in the casing are arranged in quadrature with the corresponding ports in the valve disk.

In the use of my invention as applied to the particular system illustrated steam being admitted through the train pipe A will pass through the supply pipe B to the valve D. If this is turned off, that is if the indicator S is in the position $t$, steam will not be admitted. If the indicator should be in the position $t^1$ the ports Y $Y^1$ will have made a quarter turn so as to cause port Y to be alined with the outlet port X (Fig. 5) and steam will therefore flow through said port to the connected radiator E G. If the indicator S should be in the position $t^2$ the two ports Y $Y^1$ will each have made a half turn and will be in alinement with the outlet ports X $X^1$, as indicated in Fig. 7, whereupon steam will flow to both of the radiators.

I have indicated in the accompanying drawings two radiators situated upon one side of a car. The number of radiators is not material. There may be more than two, in which case the valve ports Y $Y^1$ may be correspondingly increased and there will be an outlet port X $X^1$ for each radiator. It will be observed that the valve ports Y $Y^1$ are of the same size and situated the same distance apart as are the outlet ports X $X^1$. Therefore there may be any number of each of the said ports and steam may be admitted through them to any desired number of radiators up to the total number by turning the valve disk N to a greater or less extent.

It will be observed that the spring Q is double acting, i. e. it presses the collar $p^2$ (and its attached stem) up, and it also presses the valve N down, thereby causing both parts to fit tightly against their respective seats. The pressure of the steam in the valve chamber reinforces this double action of the spring by pressing the collar $p^2$ upwardly against its seat, and by pressing the valve N downwardly against its seat. This causes the collar $p^2$ to press against its seat with such force that it becomes practically self-sealing. Thereupon the stuffing box R might be omitted, and if this stuffing box is used it may be packed without shutting off steam as the gland $r$ may be unscrewed and the box repacked, and during this operation the disk $p^2$ prevents escape of steam.

In the foregoing embodiment of my invention it will be observed that port X is first opened. Therefore when steam is desired in but one radiator it is admitted to radiator E—G which is nearest the side of the car. The passengers are then protected by the cold radiator H against burning themselves. It will also be observed that I have described and illustrated radiators upon but one side of a car. The arrangement on the other side of the car as illustrated is a duplicate of that above described, having its own admission valve and its own return pipes.

The apparatus and devices herein described are illustrative of one embodiment of the invention and are not to be understood as limiting me to the particular construction or constructions illustrated. For instance outlet ports may be provided in number as desired for attachment to any desired number of radiator pipes and the valve and seat will have a corresponding number of ports. Any desired number of radiators may be employed. Likewise the valve construction may be modified and the valve although illustrated with a plurality of outlet ports may be employed with advantage in a construction where only one radiator is present, and in this case but one outlet port would be necessary. These and other modifications within the limits of the appended claims are contemplated by me, and are within my invention.

What is claimed is:—

1. A valve having an inlet port, a plurality of separated outlet ports therethrough and a rotary valve disk having ports corresponding in number, size and the space separating them to said outlet ports, said disk having a movement of approximately a half turn, and said disk ports being located at one side of a diameter of said disk and the outlet ports being correspondingly arranged, whereby the disk when turned to its extreme movement in one direction will close communication between said ports and when turned in the opposite direction will open communication with said ports successively and when communicating with a plurality of outlet ports will at all times open each one to the same extent, and in its extreme opposite position will open full communication between said inlet port and all said outlet ports.

2. A valve having an inlet port and a plurality of outlet ports, said outlet ports located in the same plane, a valve stem and a valve disk thereon having ports extending therethrough corresponding in size, number and the space separating them to said outlet ports, whereby the disk when turned will uncover said outlet ports successively and when communicating with more than one outlet port will at all times open all said ports to an equal extent and a spring connected to said valve stem and adapted by coöperation with the valve casing to hold said valve disk in adjusted position.

3. A valve having an inlet port and a plurality of outlet ports, said outlet ports located in the same plane, a valve stem and a valve disk thereon having ports extending therethrough corresponding in size, number and the space separating them to said outlet ports, whereby the disk when turned will uncover said outlet ports successively and when communicating with more than one outlet port will at all times open all said ports to an equal extent, said valve stem adapted to turn said disk but having axial movement relative thereto, a collar attached to the stem and a spring tending to exert pressure on said collar and said disk and hold same against their seats.

4. A valve having a casing provided with an admission port, a flat valve seat formed at the bottom of said casing and having a plurality of separated outlet ports therethrough, a rotary valve disk mounted in said casing and having ports corresponding in number and space separating them to said outlet ports, stops adapted to limit the movement of said disk to approximately a half turn, and said disk ports and said outlet ports being each located within a space equal to substantially half the area of said disk and at one side of a diameter thereof, whereby the disk when turned to its extreme movement in one direction will close communication between said ports and when turned to its extreme position in the opposite direction will open communication with said ports successively and in its extreme opposite position will open communication between said inlet port and all said outlet ports and said disk adapted when communicating with a plurality of outlet ports to communicate with them all to an equal extent.

5. A valve having a casing provided with an admission port, a flat valve seat formed at the bottom of said casing and having a plurality of separated outlet ports therethrough, a rotary valve disk mounted in said casing and having ports corresponding in number and space separating them to said outlet ports, stops adapted to limit the movement of said disk to approximately a half turn, and said disk ports and said outlet ports being each located within a space equal to substantially half the area of said disk and at one side of a diameter thereof, whereby the disk when turned to its extreme movement in one direction will close communication between said ports and when turned to its extreme position in the opposite direction will open communication with said ports successively and in its extreme opposite position will open communication between said inlet port and all said outlet ports, and said disk adapted when communicating with a plurality of outlet ports to communicate with them all to an equal extent, a spring indicator connected to said valve and coöperating with recesses in the casing to hold the valve in position, there being recesses for each extreme position of the valve and intermediate recesses the number of which is determined by the number of ports.

6. A valve having an inlet port, a plurality of separated outlet ports therethrough and a rotary valve disk having ports corresponding in number, size and the space separating them to said outlet ports, said disk having a movement of approximately a half turn, and said disk ports being located at one side of a diameter of said disk and the outlet ports being correspondingly arranged, whereby the disk when turned to its extreme movement in one direction will close communication between said ports, and when turned to its extreme position in the opposite direction will open communication with said ports successively and in its extreme opposite position will open communication between said inlet port and all said outlet ports, and said disk adapted when communicating with a plurality of outlet ports to communicate with them all to an equal extent, means for dispensing with packing in said valve comprising a connection between said valve and its stem which permits longitudinal movement of the stem but enables the stem to turn the valve, a collar on said stem, a flat seat therefor in the casing, and a spring between said collar and valve disk tending to press said parts to their seats.

7. A valve having an inlet port, a valve seat and a plurality of outlet ports through said seat, a valve disk having ports through it corresponding in size, number and space separating them to said outlet ports, and said disk ports lying at one side of a diametrical line through said disk when the valve is closed, and the outlet ports at the other side and the disk adapted to open communication with the outlet ports successively, whereby upon a partial turn of said disk communication is opened with one outlet port and upon a further turn communication is opened with an additional outlet port, and said disk adapted, by reason of the fact that its ports correspond in size and space separating them to said outlet ports, to communicate to an equal extent with all those outlet ports that are opened.

In witness whereof, I have hereunto signed my name in the presence of two subscribing witnesses.

EDWARD E. GOLD.

Witnesses:
HENRY M. TURK,
FRED WHITE.